US008015546B2

(12) United States Patent
Jones et al.

(10) Patent No.: US 8,015,546 B2
(45) Date of Patent: Sep. 6, 2011

(54) RAPIDLY ASSEMBLING AND DEPLOYING SELECTED SOFTWARE SOLUTIONS

(75) Inventors: Andrew R. Jones, Round Rock, TX (US); Michael R. Olivas, Austin, TX (US); Ray Z. Tan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 11/833,630

(22) Filed: Aug. 3, 2007

(65) Prior Publication Data
US 2009/0037875 A1 Feb. 5, 2009

(51) Int. Cl.
G06F 9/44 (2006.01)
G06F 9/45 (2006.01)
(52) U.S. Cl. .................. 717/109; 717/105; 715/762
(58) Field of Classification Search .......... 717/104–110, 717/120–122; 715/700, 762
See application file for complete search history.

(56) References Cited

U.S. PATENT DOCUMENTS

| | | | | |
|---|---|---|---|---|
| 6,496,202 | B1* | 12/2002 | Prinzing | 715/762 |
| 6,502,234 | B1* | 12/2002 | Gauthier et al. | 717/107 |
| 6,574,791 | B1* | 6/2003 | Gauthier et al. | 717/107 |
| 6,636,242 | B2* | 10/2003 | Bowman-Amuah | 715/764 |
| 6,678,882 | B1* | 1/2004 | Hurley et al. | 717/121 |
| 6,918,113 | B2* | 7/2005 | Patel et al. | 717/178 |
| 7,089,530 | B1* | 8/2006 | Dardinski et al. | 717/105 |
| 7,096,074 | B2 | 8/2006 | Yulevitch | |
| 7,096,459 | B2 | 8/2006 | Keller | |
| 7,103,874 | B2 | 9/2006 | McCollum | |
| 7,194,730 | B2* | 3/2007 | Pramberger | 717/120 |
| 7,225,240 | B1* | 5/2007 | Fox et al. | 709/223 |
| 7,404,175 | B2* | 7/2008 | Lee et al. | 717/104 |
| 7,451,403 | B1 | 11/2008 | Srinivasan | |
| 7,533,365 | B1* | 5/2009 | Hogstrom et al. | 717/105 |
| 7,650,572 | B2* | 1/2010 | Olander et al. | 715/762 |
| 7,681,176 | B2* | 3/2010 | Wills et al. | 717/109 |
| 7,712,094 | B2* | 5/2010 | Shapiro | 717/175 |
| 7,730,448 | B2* | 6/2010 | Meijer et al. | 717/106 |
| 7,797,678 | B2* | 9/2010 | Moulckers et al. | 717/121 |
| 7,890,927 | B2* | 2/2011 | Eldridge et al. | 717/110 |
| 7,895,568 | B1* | 2/2011 | Goodwin et al. | 717/108 |
| 7,900,186 | B2* | 3/2011 | Lucassen et al. | 717/104 |
| 2003/0204781 | A1 | 10/2003 | Peebles | |
| 2005/0216793 | A1 | 9/2005 | Entin | |

OTHER PUBLICATIONS

Chen et al, "Extraction and visualization of traceablity relationships between documents and source code", ACM ASE, pp. 505-509, 2010.*

Vanderonckt et al, "Generative pattern based design of user interface", ACM PEICS, pp. 12-19, 2010.*

(Continued)

*Primary Examiner* — Anil Khatri
(74) *Attorney, Agent, or Firm* — The Brevetto Law Group

(57) ABSTRACT

Methods and Systems are provided for assembling a software information technology (IT) solution using a graphical user interface (GUI) based development environment. Software solution building blocks (e.g., plug-ins) are selected and stored in a catalog of solutions within the development environment. Meta data is generated for each of the selected building blocks describing the building block's compatibility with other building blocks. The building blocks displayed in the catalog of solutions may be selected for the IT software solution by a software developer based on input from the customer for the requirements of the IT software solution. A set of logical relationships between the building blocks is based on the meta data, allowing the IT software solution to be created and modified by adding building blocks without incurring extensive system integration services for building block installation and configuration.

17 Claims, 10 Drawing Sheets

OTHER PUBLICATIONS

Xie et al, "Designing and comparing automated test oracles for GUI based software applications", ACM Trans software eng. and methodology, vol. 16, No. 1, article 4, pp. 1-36, 2007.*

Fernandez, "Model driven development of mobile applications", IEEE, pp. 509-512, 2008.*

* cited by examiner

```
I have a DB2 v. 8.2 Database
I have a WAS v. 5.3 Server
I have a IHS v. 6.0 Server
I have Web Services Business Building Block Meta Data
```
201

```
I can service DB2 v. 7.1, 7.2, 7.3 and 8.2 Database
I can service WAS v. 5.1, 5.2 and 5.3 Server
I can service IHS v. 6.0 Server
I can service Web Services
I can service Active Directory
I can service  LDAP
I can service  Windows 2003 Server
I can service Red Hat Linux Infrastructure Building Block Meta Data
```
205

RAPIDLY ASSEMBLING AND DEPLOYING SELECTED SOFTWARE SOLUTIONS

BACKGROUND

1. Field

The present invention relates to software, and more specifically to methods, systems and programs for software system development.

2. Background

Nearly all businesses rely on computer systems for at least some of the operational aspects of their business. The design requirements for an information technology software solution (IT solution) depend largely on the management philosophy of the customer as well as the operational needs of the business. Some of the more common IT solutions include bookkeeping and accounting systems, inventory and asset management systems, solutions to manage the company's IT network and communications infrastructure, security systems, and solutions to organize the business processes and ensure the continuum of their operations. An IT solution may be designed to perform any combination of these activities or other business functions. Software vendors are often called upon to develop new, customized solutions that address specific business needs.

A software vendor may spend a great deal of effort to develop an IT solution customized to the particular needs of a business client. It often takes many months to write, debug and streamline the computer code for an IT solution with the desired look and feel, and customized features tailored for the customer's business needs. Even though a great deal of effort may go into the development of an IT solution, the initial IT solution may not always address all of the customer's business requirements and system management requirements. It is sometimes necessary to add system management capabilities to the IT solution following the completion of the initial integration, especially if the customer's requirements are changed during the project. Even though the initial IT solution may satisfy the business requirements specified by the customer, a great deal of effort may be needed if the customer later decides to include additional management requirements (e.g., application monitoring, security, and backup/restore, etc.) or other features.

Customers can generally purchase the system management solutions from the same software vendor or software developer that handled the initial integration of the IT solution. The vendor may even have off-the-shelf system management solutions readily available. However, according to the conventional approach, once the initial integration has been completed the customer must pay for system integration services again in order to later install and configure additional system management solutions. Generally, the fees for system integration services to later install and configure the system management solutions come in addition to the fees for the earlier, initial integration of the IT solution. This can make it prohibitively expensive to add system management solutions after the initial integration has been completed.

What is needed is a more flexible and efficient approach for software system development.

SUMMARY

Embodiments disclosed herein address the above stated needs by providing methods, systems and programs for on-demand assembling of software solution building blocks, which can be deployed without extensive additional development work to bundle these solution building blocks together.

In accordance with various embodiments a software solution (also called an IT solution or IT software solution) may be assembled by storing a plurality of software solution building blocks, each of which has a functional software component and a meta data component. The meta data components describe attributes of the software solution pertaining to the requirements and compatibility of the building block. Logical relationships between the various software solution building blocks are generated based on the meta data components. A graphic representation of the various software solution building blocks may be displayed on a user accessible display, for example, in a graphical user interface (GUI) based development environment displayed on a computer monitor. The development environment is configured to receive user selections for the software solution building blocks to be included in the IT software solution. An installation and configuration wrapper is generated for each of the software solution building blocks selected by the user. Once the building block selections have been completed, a description file is generated describing the software solution building blocks and logical relationships between the subset of said plurality of software solution building blocks. Then a software solution installation image may be generated based on the description file.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 2 depicts examples of meta data for a business building block and for an infrastructure building block.

DETAILED DESCRIPTION

Figure 1:
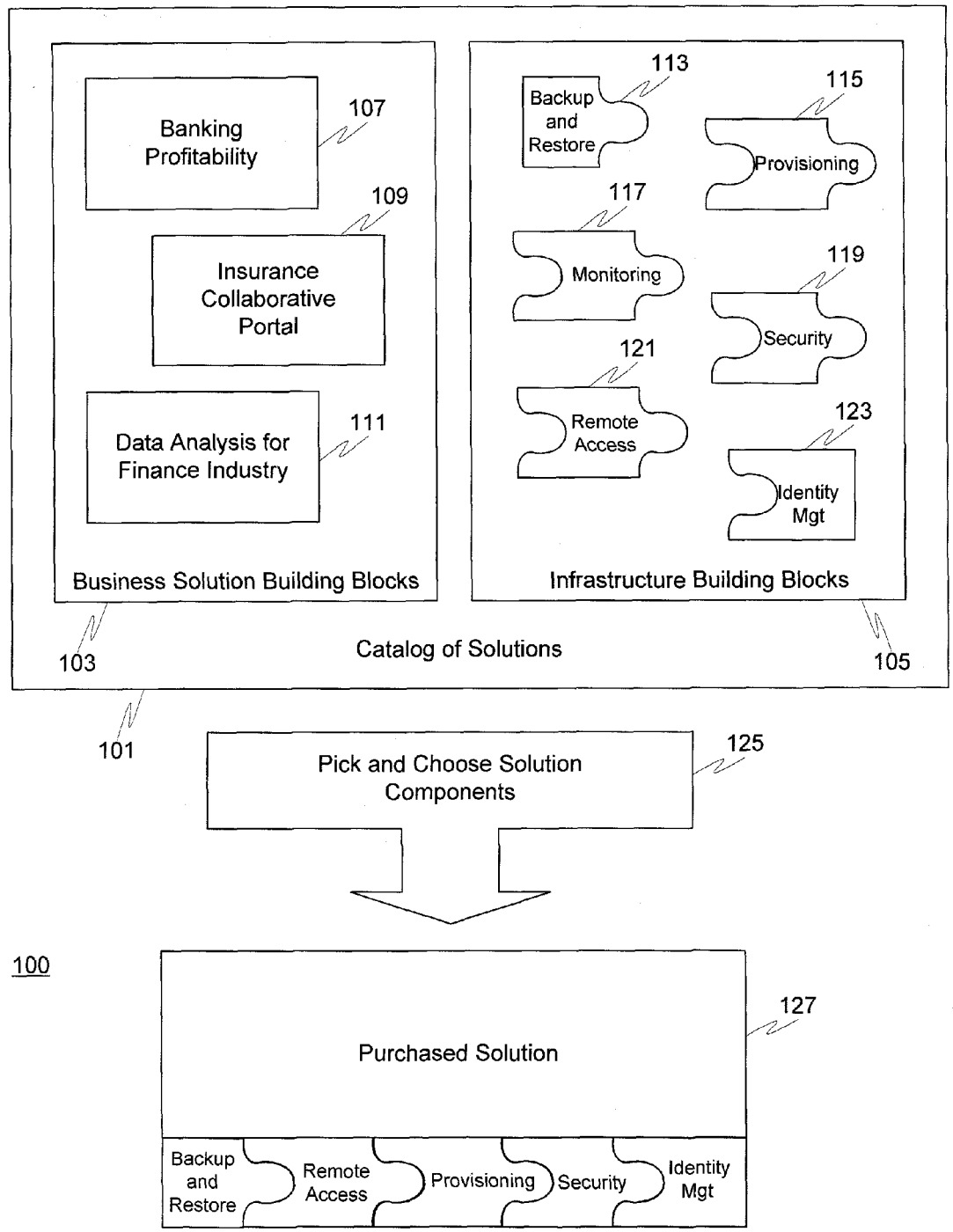
FIG. 1 depicts aspects of a process for assembling and deploying a software solution in accordance with various embodiments of the invention.

FIG. 1 depicts aspects of a process for assembling and deploying an information technology (IT) software solution in accordance with various embodiments of the invention. A well designed IT software solution can greatly enhance the efficiency and effectiveness of an organization by compiling and controlling the information from the organization's strategic, tactical, and operational endeavors. This may involve reporting and controlling the organization's information through the use of various electronic communication and computer-based of hardware and software systems. A well designed IT solution uses information technology to complement and enhance the management of the organizational operations.

One approach for developing IT software solution is to have a pre-built hard bundle of system software assets. This approach is disclosed in U.S. patent application Ser. No. 11/211,953 assigned to the present assignee, the entire contents of this patent application being incorporated by reference herein in its entirety. The approach disclosed in the '953 patent document involves an integrated development environment (IDE) concept for developers to develop solutions incorporating multiple functional requirements. In this approach a final package is generated for deployment. However, in some situations this type of approach, which involves bundling the business solution with the system management solutions, may leave the customer without as much flexibility as they desire to pick and choose components for the final IT solution. The various embodiments disclosed herein provide a great deal of flexibility to manipulate and assemble the component parts of an IT software solution.

FIG. 1 shows components of software—building blocks—being manipulated and assembled to develop an IT solution 127. In accordance with various embodiments, an IT software solution 127 can be developed by selecting software building blocks from a catalog of solutions 101 containing building blocks. The catalog of solutions 101 includes business solution building blocks 103 and a number of software infrastructure building blocks 105. Using the catalog of solutions 101, various combinations of the business solution building blocks 103 and infrastructure building blocks 105 may be assembled together as part of an IT software solution. However, before building blocks can be included in the catalog of solutions 101, steps must be taken to ensure that the building blocks are compatible with each other and are capable of being assembled together into an IT solution.

The example of a catalog of solutions 101 depicted in FIG. 1 includes a banking profitability building block 107, an insurance collaborative portal building block 109, and a data analysis building block 111. The different business solution building blocks 103 typically include business-specific components that may be tailored to the needs of various types of customers. For example, a bank may need a banking profitability solution building block 107 that addresses the bank's specific business requirements. The banking profitability building block 107 works with the other building blocks of the IT solution to monitor and report various operational aspects of the bank. For complex businesses, such as a bank, the business solution may entail monitoring, calculating, controlling and reporting many thousands of variables such as the bank's cash position, the projected interest income, the projected payroll outlays, the number of loans past due, the fees charged for various services, and any other business variables that may affect the management of the bank.

In addition to business solutions 103, the catalog of solutions 101 typically includes one or more infrastructure building blocks 105. Quite often the infrastructure building blocks 105 perform common administrative-type tasks which are not necessarily business-specific to the customer's organization, but nonetheless an important part of the operation. For example, the application monitoring solution building block 117 monitors the availability and performance of the business applications. The backup and restore building block 113 periodically saves data, and provides backup copies when needed, thus ensuring the operation continuum. The security building block 119 controls access to the system by maintaining passwords, monitoring for unauthorized access or usage, and reporting the security status. The remote access building block 121 provides a means of accessing the organization's IT system remotely, for example, via the Internet or by telephone.

A customer—such as a bank purchasing an IT system from a software developer—may initially specify a particular combination of business solutions 103 and system management solutions 105 building blocks to satisfy their operational needs. However, during a development project it often becomes necessary to add more building blocks to the IT solution, sometimes even after the initial integration has been completed. This situation can occur if the customer's requirements or needs for the IT system change during the course of the project. By using the various embodiments disclosed herein, a customer can select various combinations of these solution building blocks in real-time, and then rapidly assemble and deploy the selected solutions to the customer's IT environment. This novel approach helps avoid the inflexibility of initially hard-bundling all the solutions. Moreover, the present approach often results in a more cost effective IT solution, producing savings for the integration service costs while delivering a streamlined custom tailored final product.

The catalog of solutions 101 containing solution building blocks may be created as a software development tool for use in building customized IT solutions according to specifications provided by customers. The catalog of solutions 101 allows customers to pick and choose the particular building blocks for their IT solution that suit their specialized organizational needs. The catalog of solutions 101 for general software development may include any number of business building blocks 103 and system management building blocks 105, in addition to those depicted in FIG. 1. In some instances, depending upon the needs of a particular customer, a specialized catalog of solutions 101 may be formed in anticipation of working with that customer. For those instances where a catalog of solutions is created (or modified) with a particular customer in mind, it would only have that customer's business solution building block (e.g., the banking profitability building block 107) along with all the infrastructure building blocks 105 likely to be wanted by the customer. Some of the building blocks in the catalog of solutions 101 may be custom made while others are off-the-shelf. That is, some of the solution building blocks may be created specifically for the customer's particular IT solution by the software developer, while others may be existing building blocks which were previously developed. Previously developed building blocks are sometimes suitable for use as is, but often require slight modification to suit the particular needs of the customer. Since the business building blocks 103 are generally related to a particular customer's business they tend to be created by the software developer for that customer. Sometimes, however, an existing business building block may be suitable for use in a customer's IT solution, either as is or with some modification. On the other hand, the infrastructure building blocks 105 often relate to the type of activities that take place in most different organizations. Granted, some customers may have specific infrastructure needs that require one or more custom made infrastructure building blocks. However, it is often the case that at least some of the infrastructure building blocks can be retrieved from a library of previously developed infrastructure building blocks.

The catalog of solutions 101 contains a menu, or selection, of business solution building blocks 103 and infrastructure building blocks 105 suitable for use in developing an IT solution to meet the customer's information technology needs. The combination of business building blocks 103 and infrastructure building blocks 105 provides the customer and software developer with a selection of solution tools from which the components of the final IT solution may be chosen. The activity 125 depicted in FIG. 1 represents the choosing of component building blocks to be used in the final purchased IT solution 127. However, in order to be able to pick and choose components building blocks, the components should be compatible with each other. That is, the component building blocks should be capable of working together and being connected to each other in order to pass and receive data, controls, and other information in the proper formats. This is achieved through the use of meta data to identify and describe the key attributes of the building block. As the building blocks of a software solution are created, or selected, meta data is generated or retrieved to identify the key attributes of the building block.

FIG. 2 depicts an example of meta data suitable for use in the various embodiments. Meta data identifies key attributes of the building block to which it belongs. For example, the metadata can identify aspects of the building block, list the capabilities and other information of the building block, and specify the attributes of the building block's subcomponents. The meta data includes the information needed to build relationships between the building blocks to be used in creating the combined IT solution, for example, all the building blocks to be included in a catalog of solutions for an IT solution development project. The metadata for a building block may either be created by the developer or automatically generated by the development platform. Metadata is configured to be loaded into a common rules engine for building relationships between the building blocks that are to be used in creating a combined IT solution.

Business building block meta data 201 is typical of meta data that describes key attributes of a business building block. The meta data of a business building block provides information about the software application components in the business building block. Such software application components may include one or more databases and servers contained in the business building block, the building block's web service, and any other like types of software application components associated with the business building block. In the example of FIG. 2, the meta data 201 indicates that its business building block contains a DB2 version 8.2 database management system, a WebSphere Application Server (WAS) version 5.3 web server, an IBM® HTTP Server (HIS) version 6.0 web server, and Web Services.

Meta data 203 is typical of meta data describing the key attributes of an infrastructure building block that provides administrative and system management services to other building blocks. Meta data 205 indicates that the infrastructure building block is compatible with the DB2 version 7.1, 7.2, 7.3 and 8.2 database management system. Meta data 205 also indicates that the infrastructure building block is compatible a WAS v. 5.1, 5.2 and 5.3 server, an IHS v. 6.0 server, a Windows 2003 Server, Web Services, Active Directory, Lightweight Directory Access Protocol (LDAP) and Red Hat Linux, among other things. As such, the building block that meta data 205 belongs to can operate with any of the listed software application components. It can be seen from the meta data that the infrastructure building block associated with meta data 205 does not contain any software application components itself because the meta data does not say "I have an (application component)." However, if a WebSphere Application Server (version 5.2) was added to this infrastructure building block, its meta data 205 would be alter to add the line: "I have a WAS v. 5.2 Server."

Figure 3:
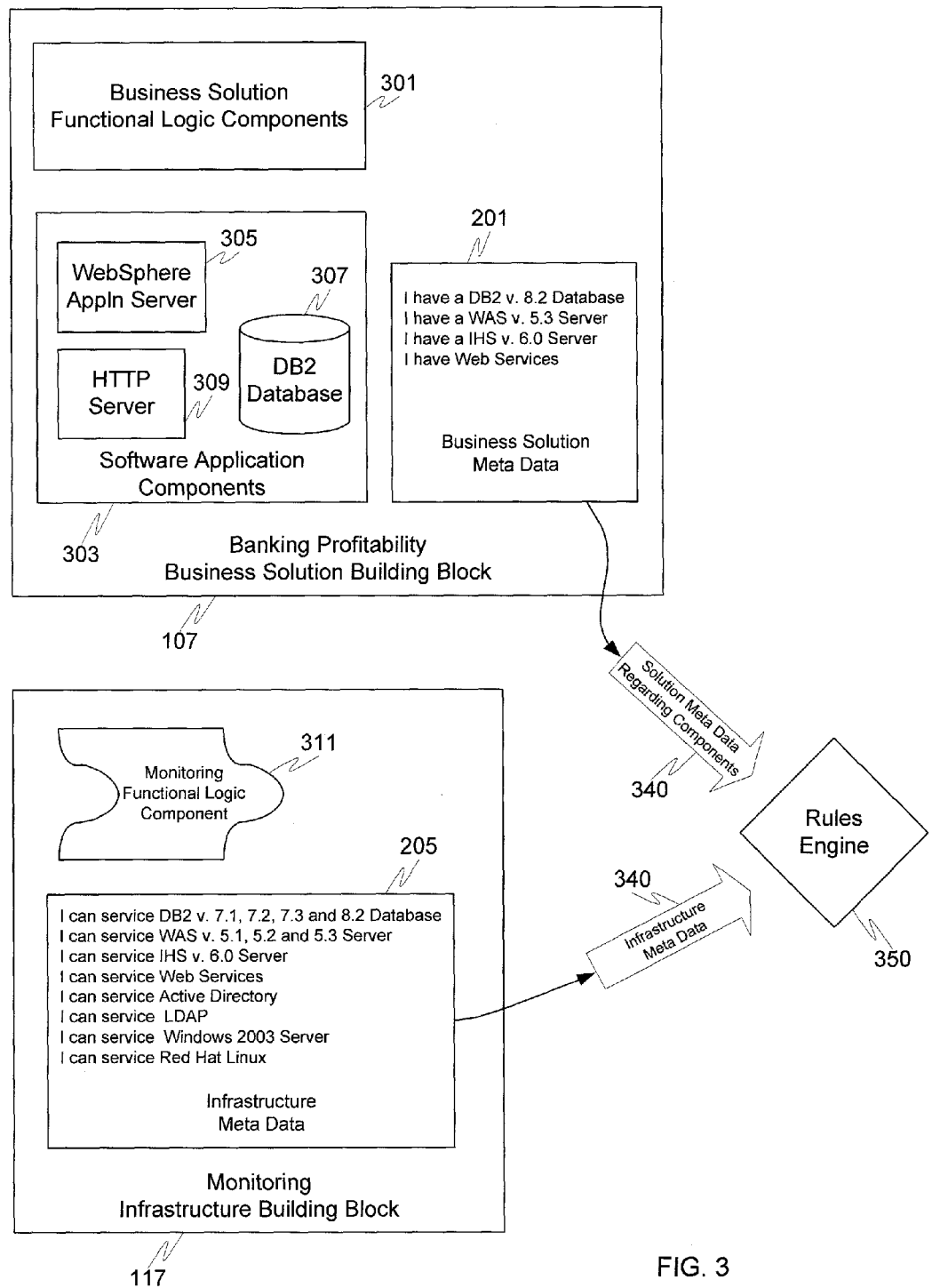
FIG. 3 depicts functional logic components and meta data for an exemplary business solution building block and infrastructure building block.

FIG. 3 depicts functional logic components and meta data for business solution building block 107 and infrastructure building block 117. The business solution building block 107 includes software application components 303. Software application components are typically the software packages or application programs that perform functions such as providing web services, managing and manipulating database information, performing email functions, providing web hosting services, or other like types of activities. Software application components 303 of the FIG. 3 includes a WebSphere application server 305, a DB2 database management system 307 and an HTTP server 309. The meta data 201 of banking profitability building block 107 identifies the key attributes of the building block. The infrastructure building block 117 of FIG. 3 includes the logic function for monitoring 311.

The meta data 205 of building block 117 identifies the key attributes of the building block, including the various software application components the infrastructure building block 117 is compatible with. To validate the building block for compatibility with other building blocks the meta data of the building block is loaded into rules engine 350. Meta data used to create rules in the rules engine, so that the proper rules may be invoked in response to selecting a particular building block for use in an IT solution. This is indicated in FIG. 3 by activity 340 showing the meta data of each respective block being provided to the rules engine 350. Further data for the process of creating rules from meta data is shown in FIG. 4.

Figure 4:
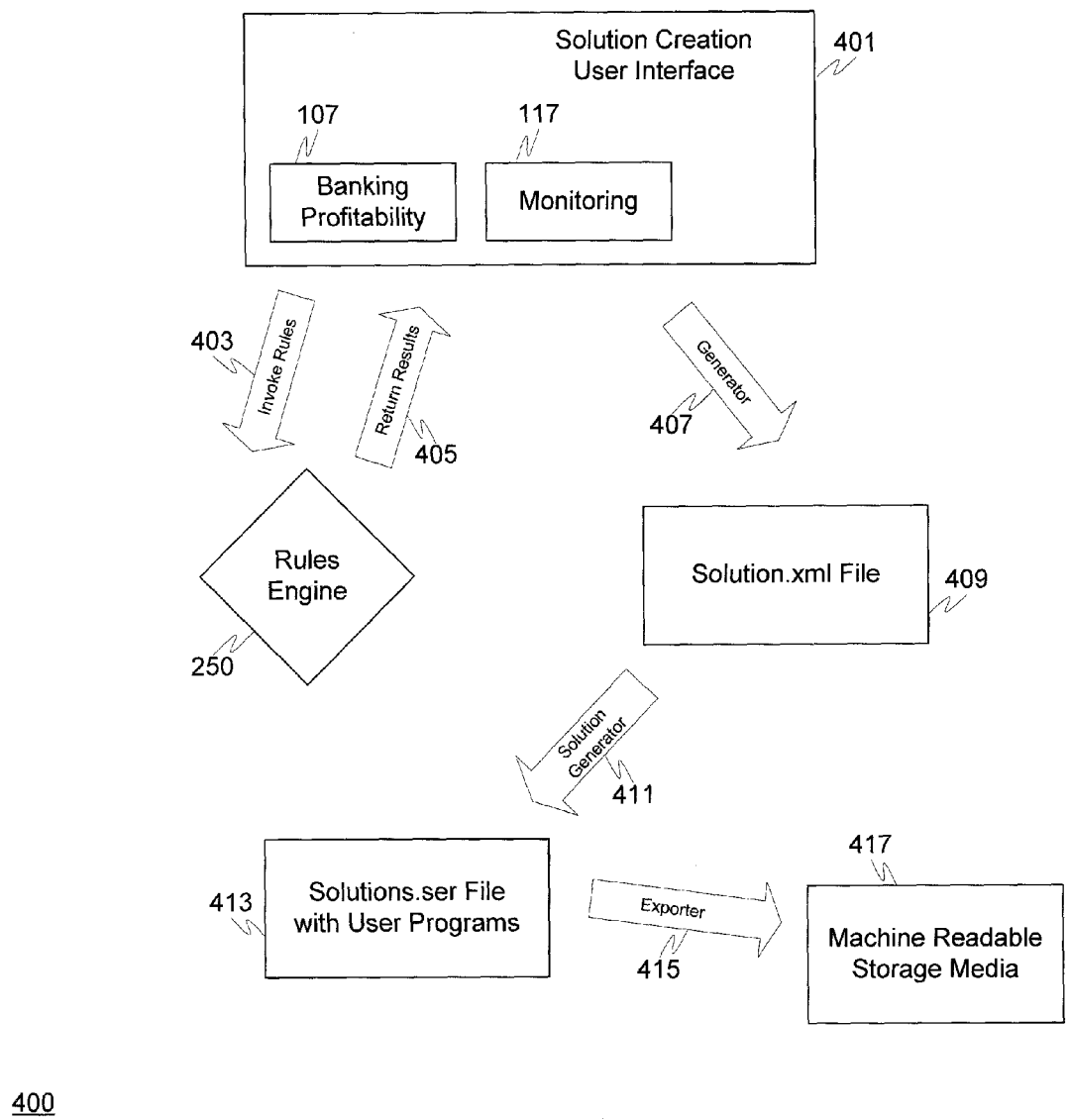
FIG. 4 depicts further details of a process for combining business solution building blocks with infrastructure building blocks to create a software solution.

FIG. 4 depicts further details of a process for combining business solution building blocks with infrastructure building blocks to create a software solution. In the figure, the solution creation user interface 401 represents a development environment for creating, configuring and manipulating building blocks during the creation of an IT solution. The example of FIG. 4 depicts two building blocks contained in the solution creation UI 401, the banking profitability building block 107 and the monitoring solution building block 117. Activity 403 represents a building block's meta data being loaded into the rules engine 250 to build relationships between the building blocks that are to be available for use in the IT solution (e.g., the building blocks to be included in catalog of solutions 101 of FIG. 1). Once rules have been created for the building blocks the results are returned to solution creation UI 401 as indicated by activity 405.

After the rules have been loaded, or reloaded, into the rules engine for each of the building blocks and the rules have been returned to the solution creation UI 401, the process of selecting building blocks for the IT solution may begin. Typically, the customer, or a representative of the organization buying the IT solution, would work with the software developer to interact with the solution creation UI 401. At this time, the building blocks that are needed can be selected for use in creating the IT solution. As each selection is made the business rules would be invoked through the rules engine to validate the key pieces of the building block needed to solve the customer solution.

Once the building block selections have been completed, the results are provided to generator 407 to create a solution file. The solution file may be an xml file as shown in block 409, or any other type of file suitable for describing the IT software solution. The solution file is created based on the existing workspace on the server, that is, the building block selections made by the customer. Upon completing the solution file 409, the solution binary can be generated as indicated in the solution generator process 411. This results in a binary file of the IT solution, depicted in FIG. 4 as solutions.ser 413. The solution binary wraps all of the application and infrastructure building blocks together. After the binary is generated, the IT solution software can be stored on a media to provide to the custom for integration into their systems. An exporter batch process 415 can be used to export the solution to a machine readable media such as a CD, DVD or other type of media that the customer can use to install the IT solution software. Some of these steps may be performed using the IBM® Solution Assembly Toolkit once the solution file (e.g., xml file) has been created.

The activities in FIG. 4 can also be described in terms of taking a layered approach. That is, each building block can implement a configuration wrapper (sometimes called an installation wrapper). A launcher invokes one or more configuration wrappers to start the series configuration (installation) process. To deploy one specific building block, only its one wrapper needs to be invoked by the launcher. However, if an architecture calls for multiple building blocks, the launcher will invoke multiple wrappers, e.g., one wrapper for each building block. In this way the solution still provides one single installation. After the rules have been loaded, or reloaded, into the rules engine for the building blocks, the developer and customer can configure the IT solution by interacting with the solution graphical user interface (GUI) frontend of the development platform, as described in further detail in conjunction with FIGS. 5A-5D.

Figure 5A:
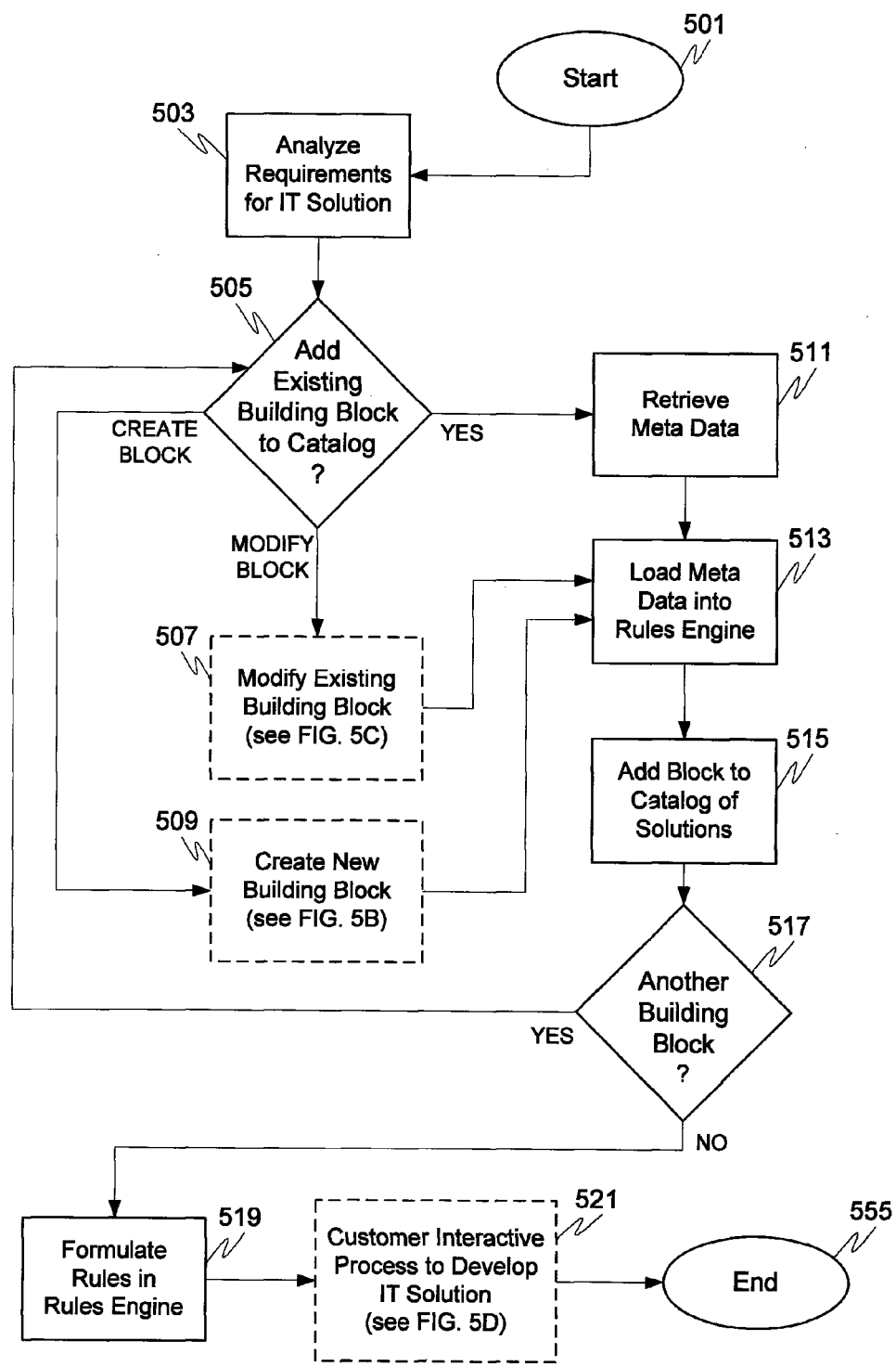
FIGS. 5A-5D depict a flowchart of a method for creating and/or modifying an IT software solution according to various embodiments.
Figure 5B:
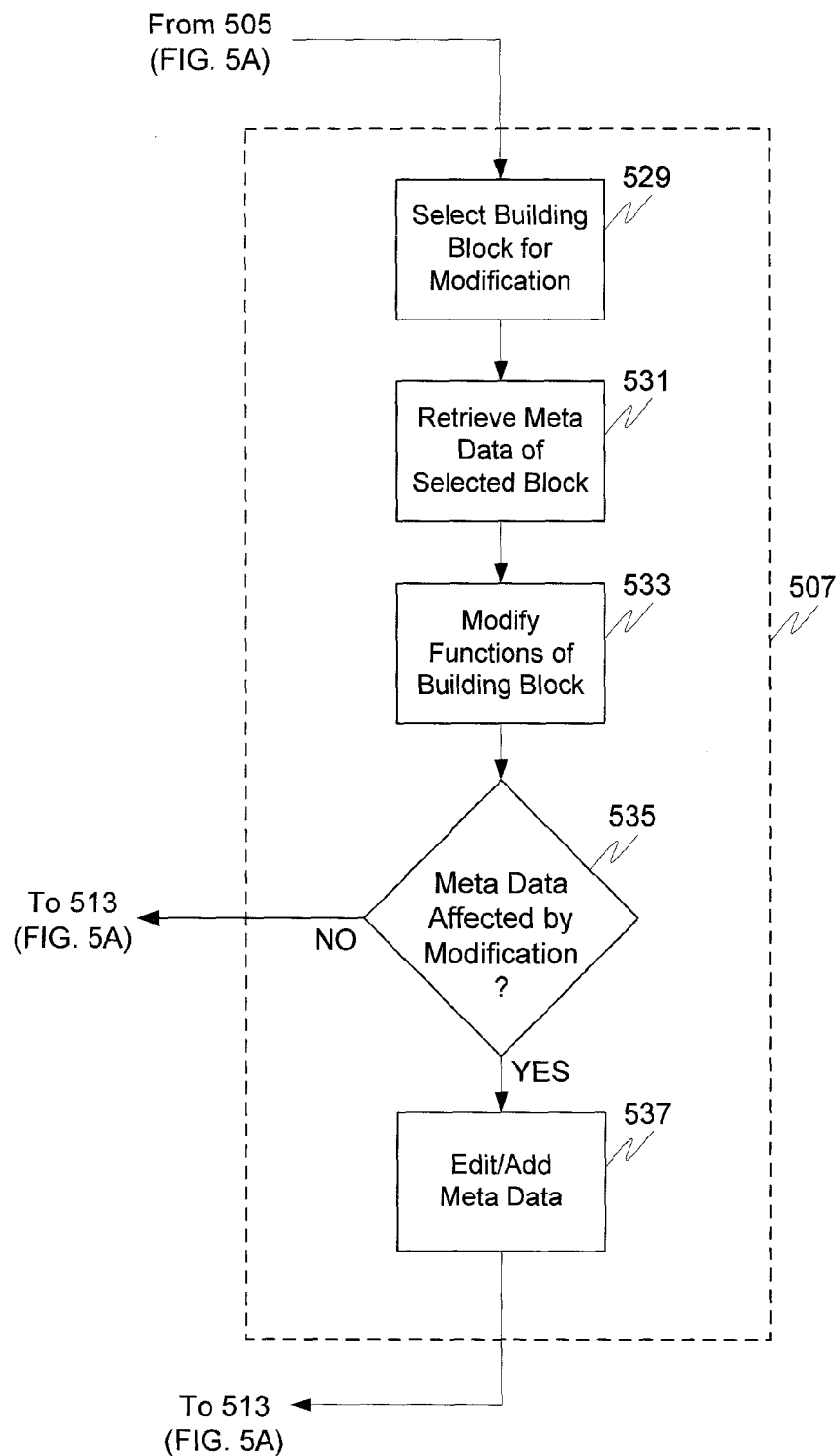
Figure 5C:
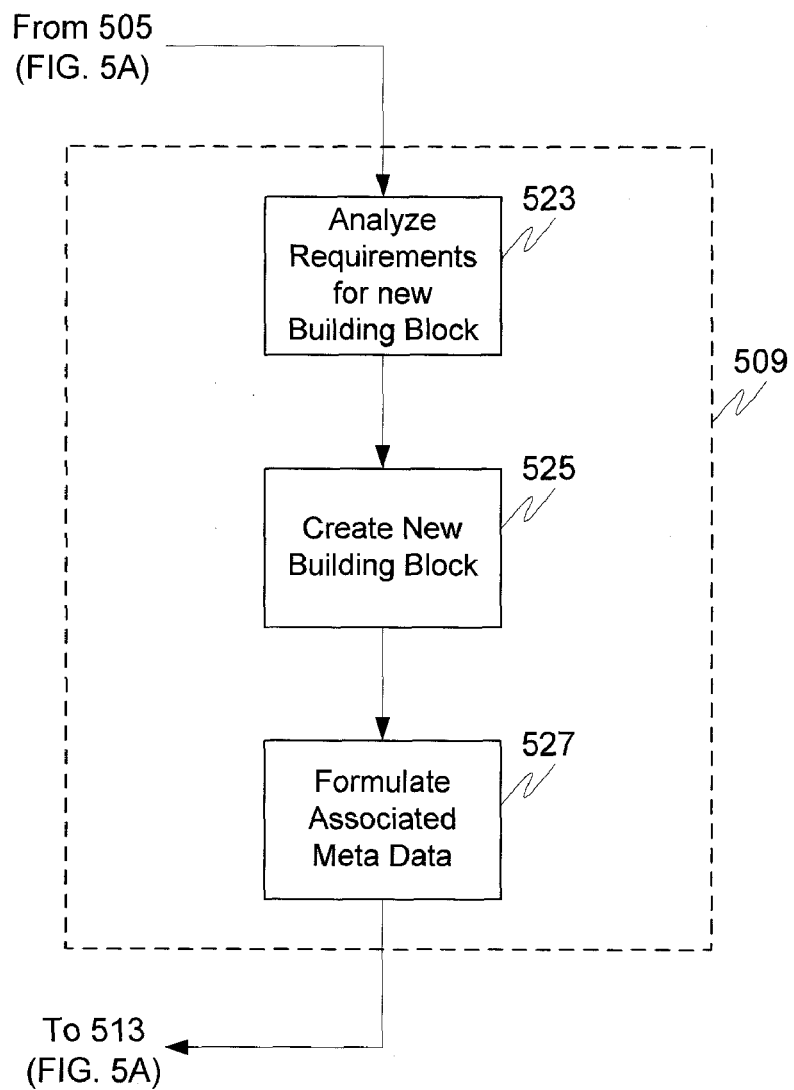
Figure 5D:
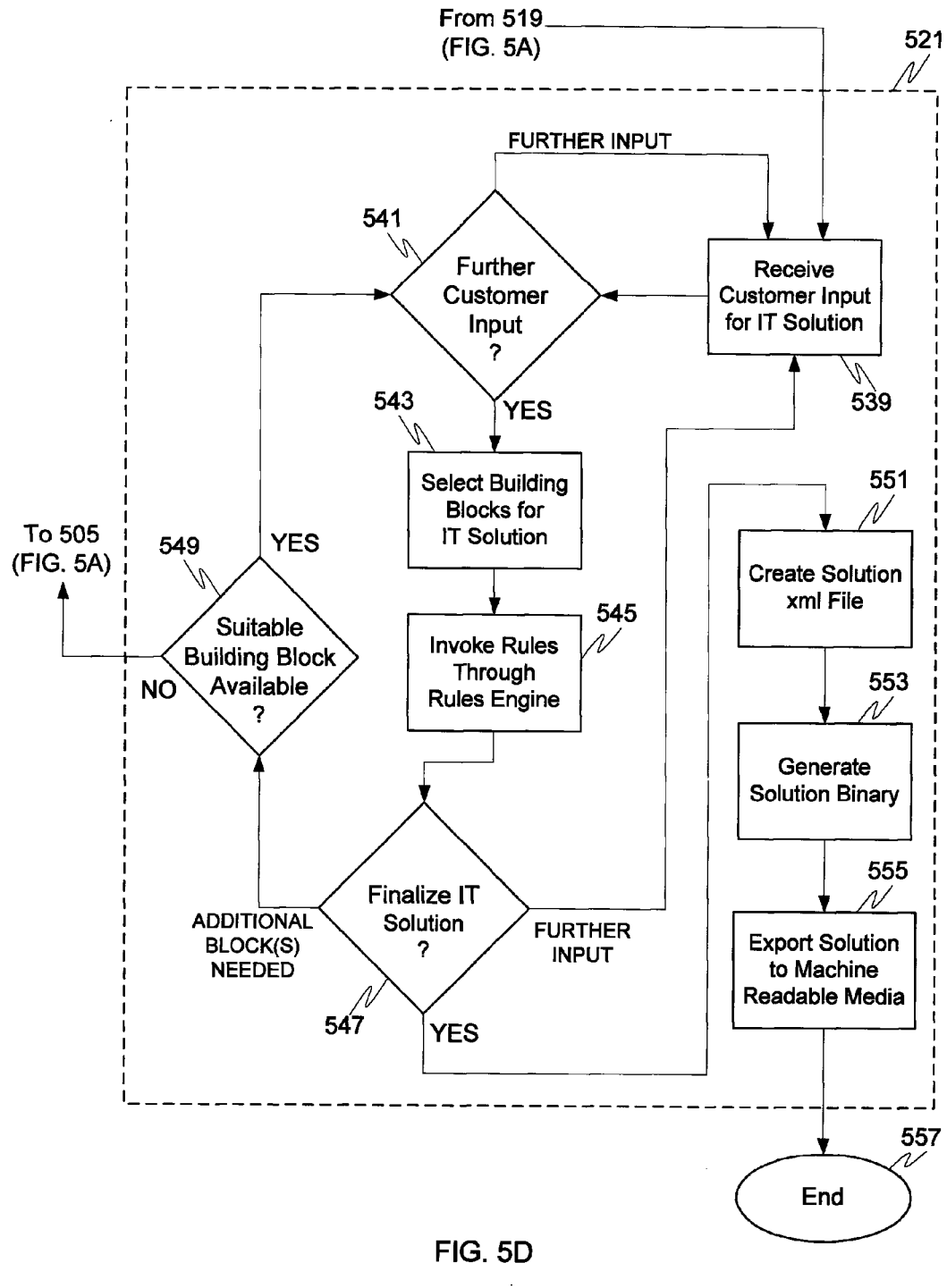

FIGS. 5A-5D depict a flowchart of a method for creating an IT solution according to various embodiments. In FIGS. 5A-5C a number of building blocks are prepared, along with their associated meta data, to provide a selection of building blocks in anticipation of building an IT solution for the customer. One task carried out in FIGS. 5A-5C is to gather suitable building blocks that may prove to be useful in creating an IT solution, for example, as shown in the catalog of solutions 101 of FIG. 1. The catalog of solutions 101 may be created as part of a general software development tool that allows a customer (or the developer) to pick and choose the most appropriate building blocks from a selection of building blocks gathered in the catalog of solutions 101. In FIG. 5D, the IT solution is constructed based on input or feedback from the customer.

FIG. 5A depicts a flowchart of a method for putting together or modifying a catalog of solutions to be used as an IT software system development tool. In FIG. 5A the method begins at 501 and proceeds to 503 where customer IT system requirements are analyzed. This often entails anticipating the IT solution needs and performance expected from the various types of customers the software developer will be working with. The IT solution requirements may vary, depending on the various industries served and the nature of the customers' business that the software developer anticipates working with. A software developer with a highly specialized practice serving a narrow niche of customers would likely be able to develop more specialized software development tools. Once the IT solution requirements the software developer anticipates facing have been ascertained in 503 the method proceeds to 505. In 505 it is determined whether there are existing building blocks suitable for use in the catalog of solutions 101. If there are no available building blocks that are suitable as is, then building blocks may either be created, or else existing building blocks may be modified, for use in the solution. To modify an existing building block for inclusion in the catalog of solutions 101 the method proceeds along the "MODIFY BLOCK" branch from 505 to 507. Part of activity 507 involves meta data either being edited or created for the building block being modified. Further details are provided in FIG. 5B for modifying an existing block in accordance with 507 and preparing the meta data. Back in 505, to create a new block suitable for the catalog of solutions 101 the method proceeds along the "CREATE BLOCK" branch from 505 to 509. In addition to creating the new building block, the appropriate meta data is also created in 509. Further details for creating a new block and generating meta data in accordance with 509 are provided in FIG. 5C. Once an existing building block has been modified (507) or a new building block has been created (509) the method proceeds to 513.

Referring back to 505, if it is determined that a suitable building block exists the method proceeds from 505 along the "YES" path to 511 to retrieve/generate meta data for the existing building block being added. An existing building block that is to be used in the catalog of solutions 101 may be copied or otherwise retrieved from a toolkit or a library of building blocks, or from any other source of building blocks (e.g., copying the building block from another IT solution). The building block may be copied, or otherwise retrieved, by selecting it with a cursor and dragging (or copying) it from its source. Once the existing building block is available, the meta data associated with the building block is retrieved, or generated, in 511. Meta data includes the information needed to build relationships between the building blocks which are to be available for creating the combined IT solution. Meta data typically includes information about the software application components or other software (e.g., DB2, WAS, Red Hat Linux, etc.) either included in the building block or compatible with the building block. The meta data may be stored in a file associated with, or referenced by, the building block. In some implementations the meta data may constitute a portion of the building block itself for example, as a routine or code stored as part of the building block. In other implementations the meta data may be separate from the building block but referenced by the development platform so as to be associated with the appropriate building block during the process of constructing the IT solution.

Once the meta data for the existing building block has been retrieved or generated the method proceeds to 513 to load the meta data into a rules engine. The rules engine analyzes the metadata components to generate logical relationships between the software solution building blocks. To do this the rules engine needs to have access to the meta data of each building block. This is achieved in 513 by either loading the meta data into the rules engine, or else pointing to a source (e.g., providing a location of a file or code) for the meta data to facilitate retrieval by the rules engine. Once the meta data for the added building block has been loaded, and the rules engine has analyzed the meta data to generate logical relationships between the software solution building blocks, the method proceeds from 513 to 515. In 515 the building block and associated meta data are added to the catalog of solutions 101 or other workspace for development of the IT solution. Once the building block has been added to catalog of solutions the method proceeds from 515 to 517.

In 517 it is determined whether any more building blocks are to be added. If it is determined in 517 that another building block is to be added—for example, by modifying an existing building block—the method proceeds from 517 back to 505 along the "YES" branch. In 505 the method proceeds along the "MODIFY BLOCK" branch to 507 in order to begin the process of modifying a building block. The process of modifying an existing building block in 507 (shown in dashed lines) is described in further detail in FIG. 5B.

Referring to 529 of FIG. 5B (which is part of 507 of FIG. 5A), a building block is selected for modification. In considering a customer's needs for an IT system it may sometimes happen than an existing building block nearly meets the requirements for a given function. In such cases it is often more efficient to modify the existing building than to construct one from scratch. Once a similar building block has been selected for modification, the method proceeds from 529 to 531 to retrieve the meta data for the selected block. In 533 the selected building block is modified to suit the desired needs, and the method then proceeds to 535 to consider the effect upon the meta data of the building block. If it is determined in 535 that the meta data has not been affected by the modifications to the building block the method proceeds back to 513 of FIG. 5A via the "NO" branch to load the meta data into the rules engine. However, if it is determined in 535 that the modifications to the building block changed the block's meta data, the method proceeds to 537 by way of the "YES" branch.

In 537 the meta data for the modified building block is formulated. This may be done either by generating new meta data for the building block, or by altering the affected meta data so that it conforms to the modifications of the building block. The meta data may take the form shown in FIG. 2, and described above. Once the meta data matches the capabilities of the building block the method proceeds from 537 back to 513 of FIG. 5A to load the meta data into the rules engine. Once the meta data has been loaded into the rules engine the method passes from 513 to 515.

Referring to 517 of FIG. 5A, if it is determined that another building block is desired—for example, a newly created building block—the method proceeds from 517 back to 505 along the "YES" branch. In 505 the method proceeds along the "CREATE BLOCK" branch to 507 to begin the process of creating a new building block. The process of creating a new building block in 509 (shown in dashed lines) is described in further detail in FIG. 5C.

Referring to 523 of FIG. 5C (which is part of 509 of FIG. 5A), the requirements for the new building block are analyzed to determine what functions the building block will perform, what information the building block will process, and how the building block will potentially be related to other building blocks within the final IT solution. Once the requirements are understood the method proceeds to 525 where the new building block is created. The creation of the building block may entail writing code for the new building block, or selecting and connecting components in a GUI-based development platform designed for the creation of building blocks. Once the building block has been created in 525 the method proceeds to 527.

In 527 meta data for the newly created building block is generated. The meta data may be generated by the development platform or other tool used to create the new building block. Alternatively, the meta data may be created by another tool and associated with the newly created building block. The meta data may have a predefined format—that is, it may be encoded in a predefined manner designed to be interpreted by the rules engine, for example, as shown in FIG. 2. Once the meta data has been formulated for the new building block the method proceeds from 527 back to 513 of FIG. 5A to load the meta data for the new block into the rules engine. Once the rules engine has finished analyzing the metadata to generate logical relationships the method proceeds to 515. In 515 the newly created building block is added to the development platform, and the method proceeds to 517.

In 517 it is determined whether another building block is to be added to the catalog of solutions. In no further building blocks are to be added the method proceeds from 517 along the "NO" branch to 519. In 519 the rules engine, having all applicable meta data loaded into it, formulates rules for providing connection and interaction between the building blocks. Once the rules have been formulated the method proceeds to 521. The process of interacting with the customer to tailor an IT solution meeting the customer's needs is performed in 521 (shown in dashed lines). This process is described in further detail in FIG. 5D.

Referring to 539 of FIG. 5D (which is part of 521 of FIG. 5A), input is received from the customer regarding the IT solution. The input may be a user (e.g., customer or software developer) selection of a subset of the building blocks to be used in the IT solution from the catalog of solutions. The input may be communicated in any way convenient to the parties. For instance, the parameters of the IT solution can be provided in a specification referenced by the work order or contract for the IT solution, or the desired functions of the IT solution can be described in a memo or statement of requirements. In some instances the customer may participate in the formation of the IT solution in person, for example, by sending a contract representative to meet with the software developer. In any case, once the customer's requirements for the IT solution have been made known in 539 the method proceeds to 541.

In 541 it is determined whether further customer input is needed for the IT solution. If the customer has further feedback to provide for the IT solution the method proceeds from 541 along the "FURTHER INPUT" path back to 539, and the process of adding (or deleting) blocks is carried out again. However, if it is determined in 541 that the client has no further input for the IT solution, the method proceeds along the "YES" branch to 545.

In 543 the building blocks are selected for the IT solution based on the customer's input for the requirements of their IT solution. Typically, building blocks are selected from a menu or palette of the development environment for example, from the catalog of solutions 101. Depending upon the input received from the customer, activity 543 may entail deleting building blocks as well. Once the building blocks have been selected in 543, the method proceeds to 545. In 545 the rules defining the relationships between the selected building blocks are invoked through the rules engine to validate the key pieces of the building blocks being used in the IT solution. By doing this it can be determined whether all of the necessary software application components are included in the IT solution. For example, if one of the solution building blocks needs DB2 to function but DB2 has not yet been selected for the IT solution, this deficiency will be detected by applying the generated logical relationships (e.g., rules) to the rules engine. Once the rules have been validated by processing them through the rules engine again, the method proceeds from 545 to 547.

In 547 it is determined whether the selection of building blocks is complete and the IT solution can be finalized. In some instances, it may be discovered that another building block is needed when the generated logical relationships are applied to the rules engine. Since the catalog of solutions may not contain building blocks suitable to address every conceivable IT solution request a customer may have, it sometimes happens that a building block must be added to the catalog of solutions during the development phase. If more building blocks are needed for the IT solution the method proceeds from 547 to 549 along the "ADDITIONAL BLOCK(S) NEEDED" branch. In 549 it is determined whether any of the building blocks in the catalog of solutions are suitable to complete the IT system design. If there is a suitable building block available the method proceeds from 549 to 541 to receive customer input, and then to 543 to select the additional block(s) needed to complete the IT solution. However, if it is determined in 549 that the catalog of solutions (or other development platform) does not include any suitable building blocks to meet the customer's requirements, the method loops back to 505 of FIG. 5A to go through the process of adding or modifying additional block(s).

Back in 547, if it is determined that more customer input is needed to completed the IT solution the method proceeds from 547 along the "FURTHER INPUT" path back to 539.

However, if it is determined in 547 that the selection of building blocks for the IT solution is finished the method proceeds along the "YES" branch to 551. In 551 a solution file is created for the completed IT solution describing the contents of the solution. The solution file may be an XML file, or other like type of file suitable for describing the solution contents. Once the solution file (e.g., xml file) has been completed in 551 the method proceeds to 553 to generate a solution binary. The solution binary wraps all of the building blocks of the IT solution together. After the binary is generated in 553 the method proceeds to 555 to store the IT solution software on a machine readable media. This serves as a vehicle for introducing the finalized IT solution into the customer's IT system. Typically, an exporter batch process can be used to export the solution to a machine readable computer storage media such as a CD, DVD, or any other type of media that the customer can use to install the IT solution software. Once the IT solution is stored on a machine readable media suitable for integrating it into the customer's IT system, the method proceeds to 557 and ends.

Figure 6:
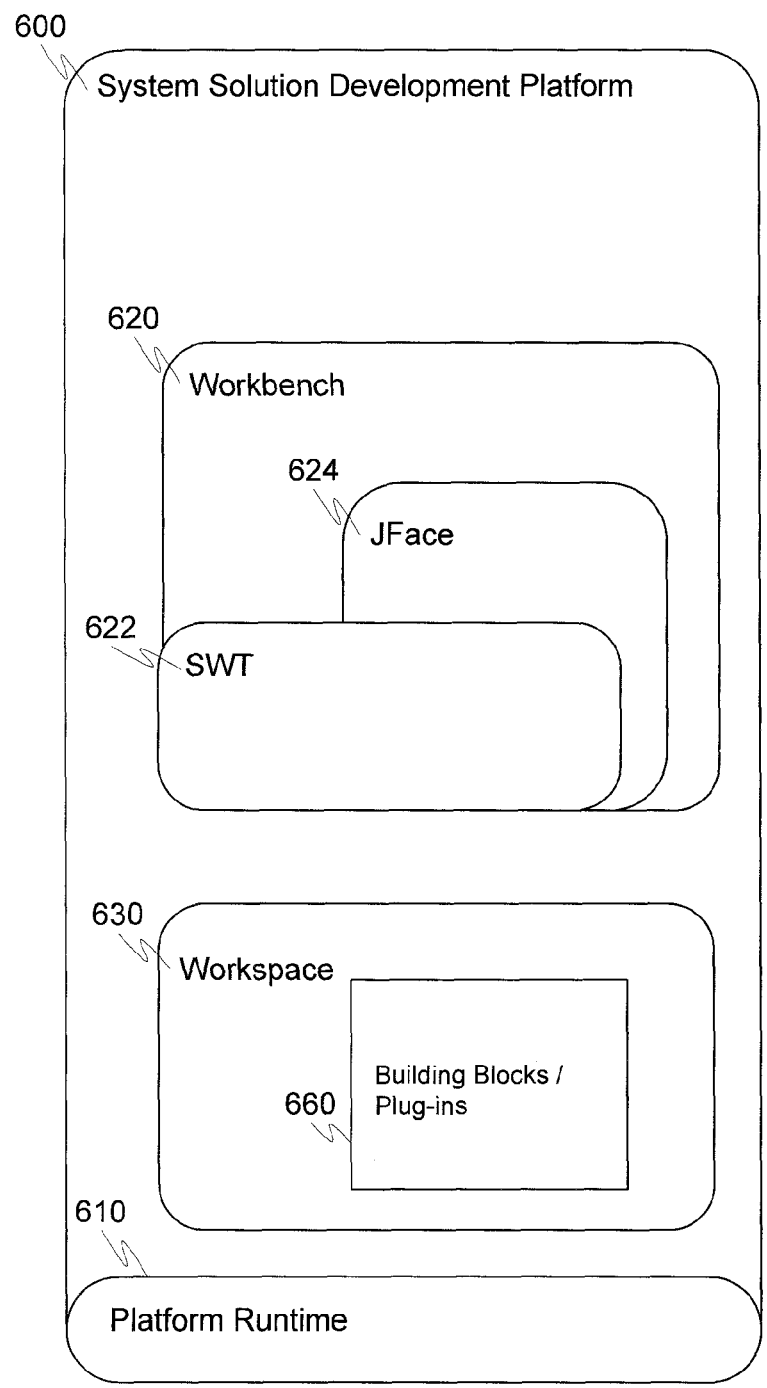
FIG. 6 depicts an exemplary software development platform architecture suitable for implementing various embodiments.

FIG. 6 depicts an exemplary software development platform architecture 600 suitable for implementing various embodiments. The platform architecture may be any of several technologies such as the IBM® Solution Assembly Toolkit or Eclipse. Both of these development platforms are an open integrated development environments (IDEs) suitable for use by a software developer or programmer to build system solutions. These development platforms are mentioned herein to illustrate and explain various embodiments, and not by way of limitation. The various embodiments may be implemented using a number of other development platforms, including for example, the platforms sold under the trademarked names: IBM's Rational Application Developer, IBM's WebSphere Studio Application Developer, Borland's JBuilder, Borland's BEA WebLogic Workshop, Oracle's JDeveloper, or other like types of development platforms.

Eclipse is an open platform plug-in based development environment that can be used to create IT software solutions. Eclipse can be used to configure and integrate plug-in modules which serve as the building blocks of an IT solution. A wide assortment of Eclipse plug-ins have already been developed, many of which are available from software vendors. Eclipse is written in Java and has been deployed on a number of systems, including for example, Windows based systems, as well as Linux systems, Solaris, QNX, and others. WebSphere Application Server is another development environment that can be used to implement various embodiments. WebSphere Application Server is based on Java Servlet technology that can be used to access and modify an existing IT solution. WebSphere Application Server includes a runtime environment and an integrated tools environment, and can be used on a variety of platforms. WebSphere Studio Application Developer is another development tool that may be used for IT software solution development. WebSphere Studio Application Developer is based on the Eclipse Workbench plug-ins and is closely related to the WebSphere Business Integration tool, another development environment that may be used. These development platforms, or others, may be used to build or modify software applications by formatting them as building blocks or plug-ins.

The Eclipse development platform typically includes a number of components, such as platform runtime 610, workspace 630 and workbench 620. The workbench 620 may be configured to include the catalog of solutions or other GUI based applications or development tools. For example, the building blocks 660 may be provided in the form of a catalog of solutions, such as the catalog of solutions 101 depicted in FIG. 1A.

Figure 7:
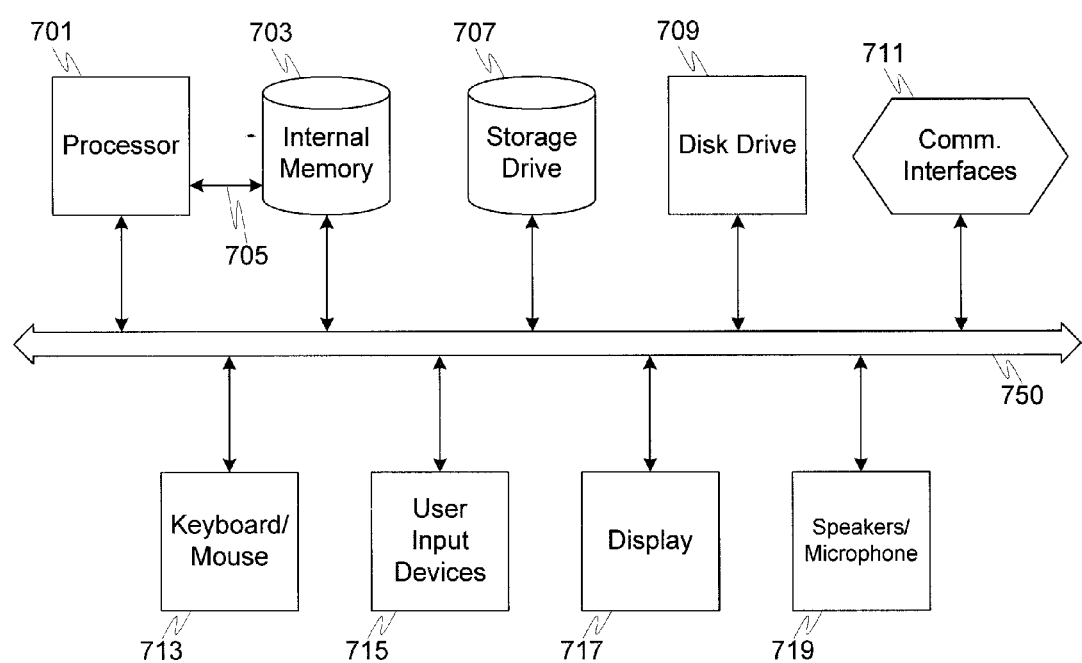
FIG. 7 depicts an exemplary computer system that may be used to implement various embodiments of the invention.

FIG. 7 depicts an exemplary computer system 700 that may be used to implement various embodiments of the invention. The computer system 700 includes a processor 701 which may be embodied as a microprocessor or central processing unit (CPU). The processor 701 is typically configured to access an internal memory 703 via a bus such as the system bus 750. The internal memory 703 may include one or more of random access memory (RAM), read-only memory (ROM), cache memory, or a combination of these or other such circuitry configured to store information in a retrievable format. In some implementations the internal memory 703 may be configured as part of the processor 701, or separate from it but within the same packaging. The processor 701 may be able to access internal memory 703 via a different bus, or via control lines (e.g., local bus 705) than it uses access the other components of computer system 700.

The computer system 700 also typically includes, or has access to, one or more storage drives 707 and floppy disk drives 709. The storage drive 707 is often a hard disk drive configured for the storage and retrieval of data, computer programs or other information. The floppy disk drives 709 may include a combination of several disc drives of various formats that can read and/or write to removable storage media (e.g., CD-R, CD-RW, DVD, DVD-R, floppy disk, etc.). The computer system 700 may either include the storage drives 707 and floppy disk drives 709 as part of its architecture (e.g., within the same cabinet or enclosure), as connected peripherals, or may access the storage drives 707 and floppy disk drives 709 over a network, or a combination of these. The storage drive 707 is often used to store the software, instructions and programs executed by the computer system 700.

The computer system 700 may include communication interfaces 711 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 700 may be interconnected by a bus 750 and/or may include expansion slots conforming to any of various industry standards such as PCI (Peripheral Component Interconnect), ISA (Industry Standard Architecture), or EISA (enhanced ISA).

Typically, the computer system 700 includes one or more user input/output devices such as a keyboard and/or mouse 713, or other means of controlling the cursor (e.g., touchscreen, touchpad, joystick, trackball, etc.) represented by the user input devices 715. A display 717 is also generally included as part of the computer system 700. The display may be any of several types of displays, including a liquid crystal display (LCD), a cathode ray tube (CRT) monitor, a thin film transistor (TFT) array, or other type of display suitable for displaying information for the user. The display 717 may include one or more light emitting diode (LED) indicator lights, or other such display devices. In addition, most computer systems 700 also include, or are connected to, one or more speakers 719 and microphones 721 for audio output and input. Speech recognition software may be used in conjunction with the microphones 721 to receive and interpret user speech commands.

In regards to the methods disclosed herein for practicing the various embodiments, many of the specified activities and steps may be included, or excluded, or performed in a different order than described above, with the rest of the activities still remaining within the scope of at least one exemplary embodiment. For example, block 519 may be omitted in some embodiments, with the rules instead being formulated at the time the meta data is first loaded into the rules engine in block 513. Another activity that can be varied is the timing of when the meta data is loaded into the rules engine in 513. FIG. 5A depicts the meta data being loaded into the rules engine for each block upon selecting the block for inclusion in the catalog of solutions. In alternative embodiments the meta data can be collected at the time each block is selected for inclusion, and then the collected meta data for all selected building blocks can be loaded into the rules engine at one time, rather than loading the meta data for one block at a time.

The invention may be implemented with any sort of processing units, processors and controllers (e.g., processor 701 of FIG. 7) capable of performing the stated functions and activities. For example, the processor 701 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the internal memory 703 or storage drive 707, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for storing a plurality of software solution building blocks each having a functional software component and a meta data component, source code for generating logical relationships between the software solution building blocks based on their meta data components, source code for displaying a graphic representation of the software solution building blocks on a display monitor, source code for receiving inputs from a user selecting a subset of the software solution building blocks, source code for generating a description file describing the subset of building blocks and their logical relationships, and source code for generating a software solution installation image based on said description file.

The use of the word "exemplary" in this disclosure is intended to mean that the embodiment or element so described serves as an example, instance, or illustration, and is not necessarily to be construed as preferred or advantageous over other embodiments or elements. The term "JT solution" or "IT software solution" refers to the information technology software system for an organization, including for example, business software designed to aid a business in carrying out its organizational functions. The terms "software building blocks" (or "solution building blocks" or "building blocks" or "blocks") used in this disclosure is intended to encompass the software components that make up an IT solution. Solution building blocks may be plug-ins (e.g., Eclipse plug-ins), modules, subroutines, or other like types units of software known to those of ordinary skill in the art.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A computer implemented method of assembling a software solution, comprising:
    storing, in a memory of said computer, a plurality of software building blocks each having a functional software component and a meta data component, the meta data component describing one or more attributes of the software solution;
    generating logical relationships between said plurality of software building blocks based on said meta data components;
    receiving inputs for selecting a subset of building blocks from among said plurality of software building blocks for use in the software solution; and
    generating a description file describing the subset of building blocks and the logical relationships between the software building blocks in said subset of building blocks;
    wherein the plurality of software building blocks comprises a first software building block that includes a first meta data component, wherein the one or more attributes of the first meta data component specify the plurality of software building blocks compatible with the first software building block.

2. The method of claim 1, further comprising:
    displaying a graphic representation of said plurality of software building blocks on a user accessible display;
    wherein said inputs for selecting the subset of building blocks include the selection of a graphical user interface (GUI) objects respectively representing each of the subset of building blocks.

3. The method of claim 1, further comprising:
    invoking a rules engine to analyze said meta data components and generate the logical relationships between said plurality of software building blocks.

4. The method of claim 3, further comprising:
    applying the generated logical relationships to determine whether to add additional building blocks for said software solution or whether one or more of the plurality of software building blocks can be modified for said software solution.

5. The method of claim 1, further comprising:
    generating a software solution installation image based on said description file; and
    exporting the software solution installation image to a machine readable computer storage media.

6. The method of claim 1, further comprising:
    generating an installation and configuration wrapper for each of said plurality of software building blocks.

7. The method of claim 6, wherein the generation of said software solution installation image is based upon the description file and uses said installation and configuration wrappers.

8. A software product comprising a non-transitory machine readable storage medium having stored thereon a program of instructions, wherein the program of instructions upon being executed on a device causes the device to:
    store a plurality of software building blocks each having a functional software component and a meta data component, the meta data component describing one or more attributes of the software solution;
    generate logical relationships between said plurality of software building blocks based on said meta data components;
    receive inputs for selecting a subset of building blocks from among said plurality of software building blocks for use in the software solution; and
    generate a description file describing the subset of building blocks and the logical relationships between the software building blocks in said subset of building blocks;

wherein the plurality of software building blocks comprises a first software building block that includes a first meta data component, wherein the one or more attributes of the first meta data component specify the plurality of software building blocks compatible with the first software building block.

9. The software product according to claim 8, further causing the device to:
display a graphic representation of said plurality of software building blocks on a user accessible display;
wherein said inputs for selecting the subset of building blocks include the selection of a graphical user interface (GUI) objects respectively representing each of the subset of building blocks.

10. The software product according to claim 8, further causing the device to:
invoke a rules engine to analyze said meta data components and generate the logical relationships between said plurality of software building blocks.

11. The software product according to claim 10, further causing the device to:
apply the generated logical relationships to determine whether to add additional building blocks for said software solution or whether one or more of the plurality of software building blocks can be modified for said software solution.

12. The software product according to claim 8, further causing the device to:
generate a software solution installation image based on said description file; and export the software solution installation image to a machine readable computer storage media.

13. The software product according to claim 8, further causing the device to:
generate an installation and configuration wrapper for each of said plurality of software building blocks.

14. The software product according to claim 13, wherein the generation of said software solution installation image is based upon the description file and uses said installation and configuration wrappers.

15. A system configured to assemble a software solution, the system comprising:
an electronically readable storage medium configured to store a plurality of software solution building blocks each having a functional software component and a meta data component, the meta data component describing one or more attributes of the software solution;
processor configured to execute instructions to generate logical relationships between said plurality of software building blocks based on said meta data components;
a display device configured to display a graphic representation of said plurality of software building blocks on a user accessible display; and
a user input device configured to receive inputs for selecting a subset of building blocks from among said plurality of software building blocks for use in the software solution;
wherein the processor further generates a description file describing the subset of building blocks and the logical relationships between the software building blocks in said subset of building blocks; and
wherein the plurality of software building blocks comprises a first software building block that includes a first meta data component, wherein the one or more attributes of the first meta data component specify the plurality of software building blocks compatible with the first software building block.

16. The system of claim 15, wherein said display device is further configured to display a graphic representation of said plurality of software building blocks on a user accessible display;
wherein said inputs for selecting the subset of building blocks include the selection of a graphical user interface (GUI) objects respectively representing each of the subset of building blocks.

17. The system of claim 15, wherein the generated logical relationships are suitable to determine whether to add additional building blocks for said software solution or whether one or more of the plurality of software building blocks can be modified for said software solution.

* * * * *